United States Patent [19]
Wöhr

[11] Patent Number: 5,343,467
[45] Date of Patent: Aug. 30, 1994

[54] SPACE/TIME SWITCHING ELEMENT HAVING INPUT/OUTPUT CIRCUITS EACH SEPARATELY SWITCHABLE BETWEEN TWO OR MORE BIT RATES

[75] Inventor: Peter Wöhr, Stuttgart, Fed. Rep. of Germany

[73] Assignee: Alcatel N.V., Amsterdam, Netherlands

[21] Appl. No.: 891,285

[22] Filed: May 29, 1992

[30] Foreign Application Priority Data

May 31, 1991 [DE] Fed. Rep. of Germany ....... 4117869

[51] Int. Cl.$^5$ ................... H04Q 11/04; H04L 12/52; H04L 12/56; H04J 3/22
[52] U.S. Cl. ...................... 370/59; 370/60; 370/84
[58] Field of Search ............ 370/84, 58.1, 59, 63, 370/64, 66, 68, 68.1, 60, 60.1, 58.2; 375/121

[56] References Cited

U.S. PATENT DOCUMENTS

| | | | |
|---|---|---|---|
| 4,071,701 | 1/1978 | Leijonhufvud et al. | 370/84 |
| 4,206,322 | 6/1980 | Lurtz | 370/63 |
| 4,485,468 | 11/1984 | Slana | 370/58.2 |
| 4,698,801 | 10/1987 | Hatano et al. | 370/84 |
| 4,718,058 | 1/1988 | van Vugt | 370/58.1 |
| 4,788,679 | 11/1988 | Kataoka et al. | 370/84 |
| 5,072,407 | 12/1991 | Gutz et al. | 375/121 |
| 5,144,297 | 9/1992 | Ohara | 370/84 |

OTHER PUBLICATIONS

"System 12 Dual Switch Port", by W. Frank, M. C. Rahier, D. Sallaerts, D. C. Upp, Electrical Communication, vol. 59, No. ½-1985, pp. 54–59.

"Alcatel ATM Switch Fabric and its Properties", by D. Boettle and M. A. Henrion, Electrical Connections, vol. 64, No. ⅔-1990, pp. 156–165.

Primary Examiner—Douglas W. Olms
Assistant Examiner—Hassan Kizou

[57] ABSTRACT

A space/time switching element in which the frame structure is based on the lowest bit rate. Within such a frame, even signals with the highest bit rate can be buffered and converted in time. The space/time switching element has inputs and outputs which are separately switchable between two bit rates. With this switching element combinations of several channels into higher-capacity connections (N × 64 Kb/s) are readily possible. Higher bits rates are therefore used only when needed. Consequently, reduction of power dissipation and spurious radiation is achieved.

11 Claims, 2 Drawing Sheets

FIG.2A

| D12 | | D23 | | D11 | | D22 | | D21 | | D24 | | D12 | | D23 | |

SPACE/TIME SWITCHING ELEMENT HAVING INPUT/OUTPUT CIRCUITS EACH SEPARATELY SWITCHABLE BETWEEN TWO OR MORE BIT RATES

TECHNICAL FIELD

The present invention relates to a space/time switching element, and more particularly, a space/time switching element for switching input signals and output signals in either a synchronous time-division multiplex (STM) or an asynchronous time-division multiplex (ATM) mode of data transmission.

BACKGROUND OF THE INVENTION

Space/time switching elements are generally known in switching technology. By way of example, reference is made to a digital switching element operating in a synchronous time-division multiplex mode (STM) which is described in "Elektrisches Nachrichtenwesen", Vol. 59, No. ½, 1985, pp. 54–59, in an article by W. Frank et al., "SYSTEM 12—Doppelport des Koppelnetzbausteins". Another example is an integrated switching element ("Integriertes Koppelelement") which operates in an asynchronous time-division multiplex mode (ATM) and is described in "Elektrisches Nachrichtenwesen", Vol. 64, No. ⅔, 1990, pp. 156–165, in an article by D. Boettle et al., "Das ATM Koppelfeld von Alcatel und seine Eigenschaften".

Every development engineer endeavors to influence the ratio between cost and usefulness in a favorable manner. Constant advances in the art permit higher operating speeds, whereby capacity and, thus, usefulness can be increased nearly without additional cost. In the above-mentioned SYSTEM 12 switching system, a bit rate of 4 Mb/s (exactly 4096 kb/s) is used on the trunks. However, the current technology of that system would also permit up to 32 Mb/s. The whole construction, particularly racks, backplanes, and connectors, could remain unchanged.

One has to bear in mind, however, that in an exchange, on the one hand, a plurality of different peripheral units are interconnected by a switching network, and that, on the other hand, step-by-step expansion is desirable. It is neither possible to simultaneously redevelop all kinds of peripheral units for an increased bit rate nor desirable in case of expansion to replace existing parts. The problems associated with the procurement of replacement parts should also be taken into account.

The same problem is foreseeable for the future ATM (Asynchronous Transfer Mode) system, where already bit rates of initially 150 Mb/s and later 600 Mb/s, possibly even 1.2 Gb/s, are under discussion.

SUMMARY OF THE INVENTION

The present invention solves this problem by providing a switching element comprising a plurality of input circuit (I1, ..., I16) each associated with one of a plurality of input lines on each of which a plurality of input signals are receivable in a time-division multiplex mode, a plurality of output circuits (O1, ..., O16) each associated with one of a plurality of output lines on each of which a plurality of output signals are placeable in a time-division multiplex mode, and switching means (Mx, Mem, Dx) for selectively assigning all input signals and all output signals to one another, characterized in that each input circuit (I1, ..., I16) and each output circuit (O1, ..., O16) are separately switchable between two or more bit rates. The use of switching elements whose inputs and outputs are switchable separately between two (or more) bit rates not only solves all of the aforementioned problems but offers some additional advantages. For example, the switchover capability can also be used to adapt the bit rate to current requirements, thereby reducing the average power dissipation and spurious radiation. By combining several channels, it is possible (in STM, Synchronous Transfer Mode) to provide connections of higher capacity.

BRIEF DESCRIPTION OF THE DRAWINGS

The invention will now be explained in greater detail, by way of example, with reference to the accompanying drawings, in which:

FIGS. 2A–2G, show highly schematically the switching procedure in a switching element in accordance with the invention.

BEST MODE FOR CARRYING OUT THE INVENTION

Figure 1:
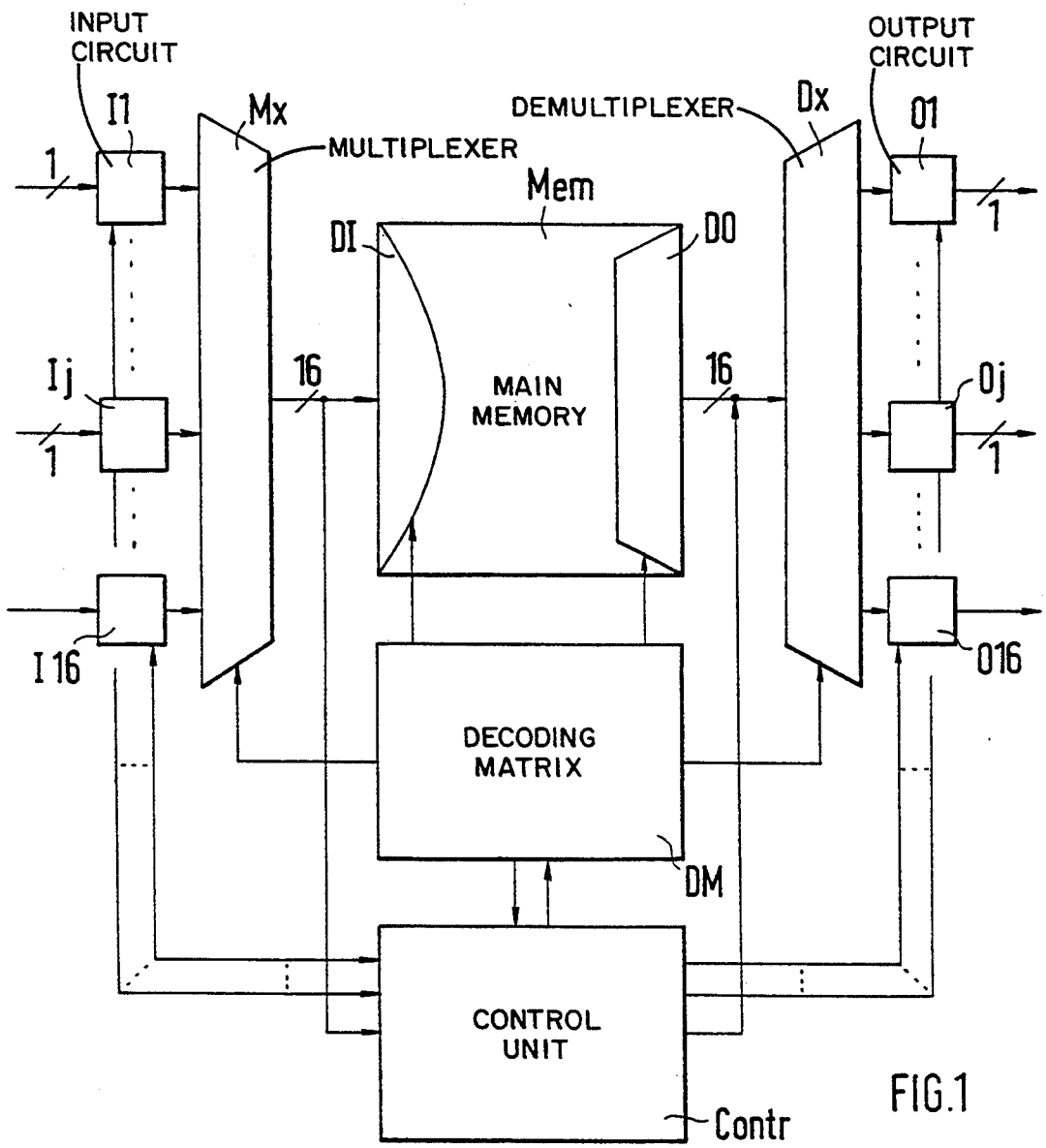
FIG. 1 is a block diagram of an embodiment of a space/time switching element in accordance with the invention.

The switching element of FIG. 1 has 16 input circuits I1, ..., I16, a multiplexer Mx, a main memory Mem, a demultiplexer Dx, 16 output circuits O1, ..., O16, and a control unit Contr with associated decoding matrix DM. The main memory Mem, in turn, has an input decoder DI, an output decoder DO, and 4096 locations (not shown) each capable of holding a 16-bit data word.

Figure 2A:
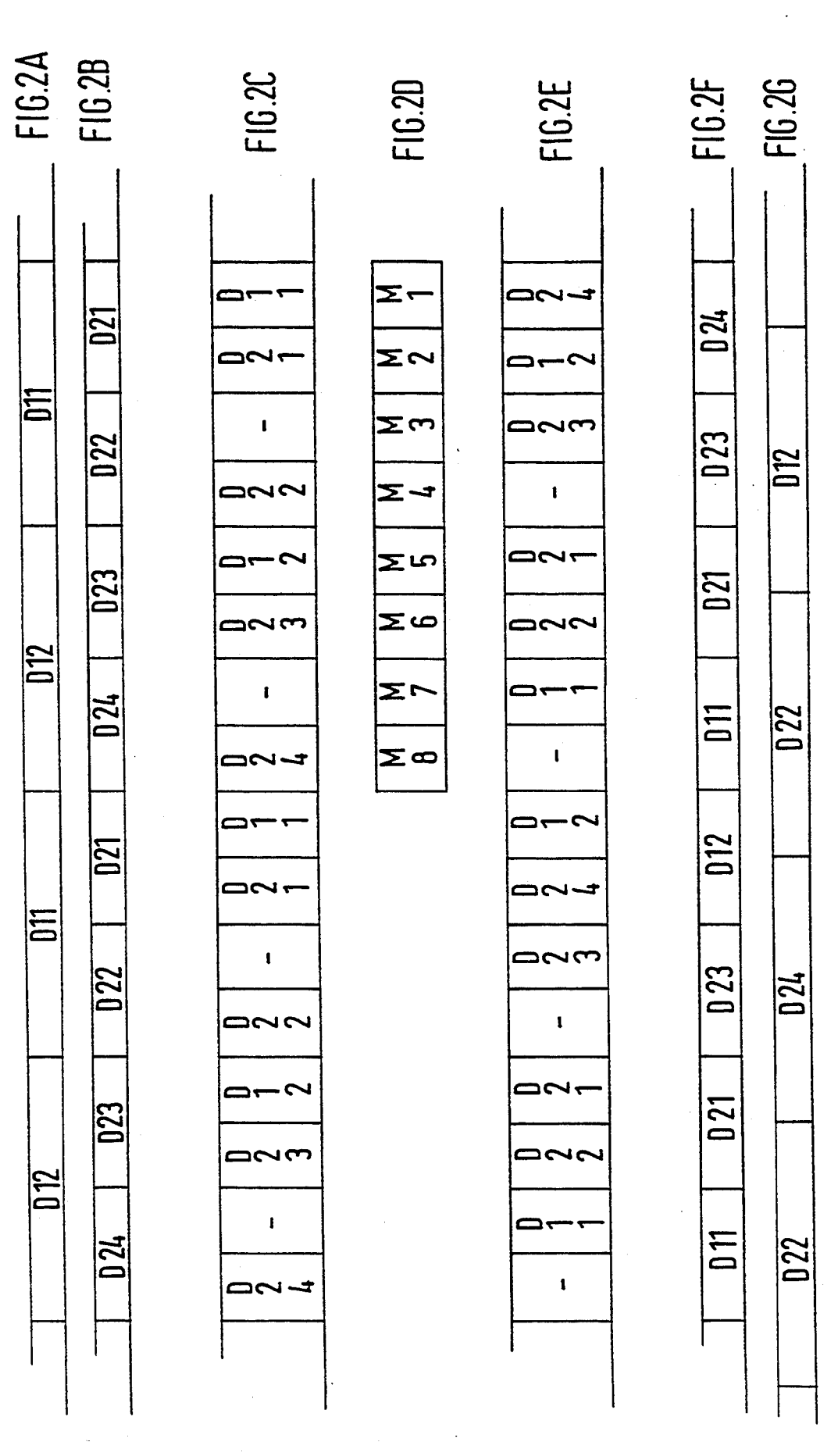

The switching procedure for a greatly simplified case is illustrated in FIGS. 2A–2G. The practically simplest case of a switching element according to the invention is assumed. This switching element has two inputs and two outputs. Per input and output, two or, after bit-rate switchover, four channels can be transmitted. FIGS. 2A, 2B, 2C, 2D, 2E, 2G show different temporal sequences for this case, and FIG. 2D shows a storage map.

At the first input, FIG. 2A, the data words D11 and D12 of two input signals divided into two channels arrive in sequence. At the second input, FIG. 2B, the data words D21, D22, D23, and D24 of four input signals divided into four channels arrive in sequence in the same time. The subdivision of these data words into different bits is not shown. The signals of the two inputs are combined into a single signal, FIG. 2C. This combined signal, which corresponds to the output signal of the multiplexer Mx in the example of FIG. 1, always has the same structure, regardless of the bit rates at the two inputs.

It has a frame structure which is based on the faster of the two bit rates and, for this, has one time slot per channel and input. In the example, a maximum of four channels is possible at each of the two inputs, i.e., a maximum total of eight channels at two inputs. For this, eight time slots are provided in the frame structure. These time slots are assigned to the inputs cyclically, i.e., in the present case with only two inputs alternately. For inputs which are operated at the slower bit rate, every other time slot remains free. In the present case, the sequence of contents is thus as follows: D11, D21, free, D22, D12, D23, free, D24.

The contents of these time slots are stored sequentially in the main memory Mem. Output from the main memory Mem takes place in a changed order which ensures that with a cyclic distribution to the outputs and their channels, the desired switching function is fulfilled. The frame structure at the output of the main memory Mem is the same as that at the input. This gives the following sequence of contents of the individual time slots at the output of the memory Mem and, thus, at the input of the demultiplexer Dx (FIG. 2E): D24, D12, D23, free, D21, D22, D11, free.

To temporarily store this data in the main memory Mem, eight locations M1, ..., M8 (FIG. 2D) are necessary and provided. Suitable methods for writing into and reading from the memory Mem are mainly the two prior art time-division multiplex switching methods, either cyclic addressing being used during write-in and selective addressing in accordance with the switching task during readout, or vice versa. The sequence of addressing during write-in may thus be M1, M2, ..., M7, M8 and that during readout M8, M5, M6, M3, M2, M4, M1, M7, or that during write-in may be M8, M5, M6, M3, M2, M4, M1, M7 and that during readout M1, M2, ..., M7, M8.

This write-in and readout can be controlled in a manner known per se, which is not specific to the invention. The units necessary therefor are shown here as input decoder DI, output decoder DO, decoding matrix DM, and control unit Contr.

The decoding matrix DM controls the following sequence of operations, for example:

| | |
|---|---|
| 1. | Mx connects I1 to D1. |
| | D1 connects Mx to M1. |
| | D11 is written into M1. |
| 2. | DO connects M8 to Dx. |
| | Dx connects DO to O1. |
| | D24 is read from M8. |
| | O1 accepts data. |
| 3. | Mx connects I2 to D1. |
| | D1 connects Mx to M2. |
| | D21 is written into M2. |
| . | |
| . | |
| . | |
| 15. | Mx connects I2 to D1. |
| | D1 connects Mx to M5. |
| | D12 is written into M5. |
| 16. | Now, M7 would have to be connected to O2 through DO and Dx. |
| | O2, however, operates at a lower bit rate, is still busy outputting D22, and cannot accept data. |
| | M7 does not contain any valid data, either. Whether M7 is connected to O2 or not is irrelevant. In either case, O2 accepts no data. |

This sequence of operations (or any other which solves the same switching task) recurs regularly and is programmed in the decoding matrix DM. This programming must be changed by the control unit Contr whenever a connection is to be established or released.

In the example of FIG. 1, the control unit Contr receives the information necessary for control as part of the data streams which also contain the data to be switched; i.e., via the input circuits I1, ..., I16. To this end, one input of the control circuit Contr is connected to the output of the multiplexer Mx. Analogously, for the output of control information, e.g., for acknowledge messages, one output of the control unit Contr is coupled to the input of the demultiplexer Dx. In many time-division multiplex systems, e.g., the above-mentioned SYSTEM 12 switching system, one channel is already provided for the transfer of control data. This channel could then include the information for the control unit Contr, as is the case in the SYSTEM 12 switching system. In the simplest case, such control information consists of the address of the decoding-matrix location to be changed and the data to be newly written into this location.

In the demultiplexer Dx, the above-described output signal from the main memory Mem, which has the frame structure shown in FIG. 2E, is cyclically switched through to the output circuits. In the simplified example of FIG. 2, the first of the two output circuits operates at the higher bit rate and accepts all data offered to it by the demultiplexer Dx, which results in the data sequence D24, D23, D21, D11, shown in FIG. 2F. The second of the two output circuits operates at the lower bit rate and, therefore, accepts the data from the demultiplexer only every other time, which results in the data sequence D12, D22, shown in FIG. 2G.

During this switching of the individual channels, the data D12 retains its low bit rate, the data D11 is converted from the low to the higher bit rate, the data D21, D23, and D24 retains the higher bit rate, and the data D22 is converted from the higher to the low bit rate. The data contents remain unchanged, of course.

The functions of the input circuits I1, ..., I16 are basically the same as in conventional switching elements. They include synchronizing the incoming signals with the internal clock of the switching element. Generally, only the phase has to be adapted. Furthermore, serial-to-parallel conversion and temporary storage until transfer by the multiplexer Mx take place. In the present case, 16-bit data words are assumed to be processed in parallel within the switching element.

A special feature of the input circuits according to the invention is that they are switchable between two bit rates. To this end, their synchronizers may be switchable between two clock rates, or each of them is supplied with one of two clock signals from the control unit Contr. It is also possible, however, to provide each input circuit with one synchronizer per bit rate (there may be more than two bit rates). Each synchronizer then tries to synchronize with the incoming data stream which can only be achieved by one synchronizer per input circuit, whose output signal is then used. In this manner, automatic switchover can be accomplished. The bit rate thus determined must be notified to the control unit Contr. If the switchover is controlled from outside, the control instruction must be transferred through the input circuit and the multiplexer to the control unit, and switchover must be initiated from there.

The output circuits O1, ..., O16 operate basically as usual. In the simplest case, each of them contains a parallel-to-serial converter which accepts a data word from the demultiplexer in parallel form and transfers it out in serial form at the selected clock rate. To effect switchover, it is only necessary in the present case to correctly initiate the acceptance of the data and select the correct clock signal. Either the selected clock signal or a switching signal for selecting the clock signal must come from the control unit Contr.

There are various possibilities of switching the bit rates in the output circuits, for example:

The switching may be effected by external control instructions, as described for the input circuits.

In particular, in a reversed switching arrangements, each output circuit (O1, O2, ..., O16) is associated with one input circuit (I1, I2, ..., I16), in particular when the switching elements are operated bidirectionally. In that case, the traffic volume is approximately the same in both directions. In particular, the switching element makes sure that a desired highest bit rate, that is possible, is switched in both directions for each associated pair of input and output circuits. The bit-rate switching for the input and output circuits is performed together. Whether this is done on the basis of a determination of the traffic volume or in response to an external control instruction is of secondary importance.

In another alternative, determination of the traffic volume for the individual output circuits is also possible. This only necessitates determining in the control circuit Contr how many locations in the main memory Mem are actually occupied for the individual output circuits. Whether a particular output circuit may be switched to a higher bit rate at all must already be taken into account in the occupation of the locations (at least in the synchronous time-division multiplex mode).

In still another alternative, the simultaneous switching of associated input and output circuits on the basis of the traffic volume, the higher of the two traffic volumes will preferably be selected and form the basis of the decision.

In still another alternative, switching of associated input and output circuits is impossible if copies are generated in the switching element, i.e., if a data word written into a memory location is read out several times. Such a mode of operation, which is known per se, is particularly suitable for a switching element according to the invention, since the necessary large number of serving channels is available here.

This switching element is also especially suited for another, likewise well-known mode of operation: It is sometimes desirable to use several channels simultaneously for one and the same connection in order to establish a connection of higher capacity. This is readily possible by using the higher bit rate and combining those time slots which fall into the same time slot at the lower bit rate.

The inventive idea is also applicable to switching elements designed for ATM, which is currently gaining acceptance. In ATM, the associated parts of a message are transmitted not in periodically recurring time slots of a frame as is the case with the conventional time-division multiplex technique STM, but in the information parts of cells (or packets) which are transmitted between cells of other messages and empty and control cells at irregular intervals. Besides the information part, each cell contains a cell header which contains at least the information given in STM by the timing, namely the association with a particular message.

In ATM, the use of the present inventive idea is even simpler. One characteristic of ATM is the randomly varying traffic volume. Between the input and output circuits of a switching element, the maximum possible traffic volume must be taken into account, i.e., in the present case the traffic volume which results if the higher bit rate is used at all inputs. In addition, ATM equipment generally includes devices for determining the traffic volume, e.g., the filling level sensors for the necessary queues (FIFOs). In the simplest case, it is only necessary here to make the clock rates in the input and output circuits switchable. Examples of ATM switching elements are sufficiently known, e.g., from the above-mentioned article by D. Böttle et al.

I claim:

1. A space/time switching element comprising a plurality of input circuits (I1, ..., I16) each associated with one of a plurality of input lines on each of which a plurality of input signals are receivable in a time-division multiplex mode, a plurality of output circuits (O1, ..., O16) each associated with one of a plurality of output lines on each of which a plurality of output signals are placeable in a time-division multiplex mode, and switching means (Mx, Mem, Dx) for selectively assigning all input signals and all output signals to one another, characterized in that each input circuit (I1, ..., I16) and each output circuit (O1, ..., O16) are separately switchable between two or more bit rates.

2. A switching element as claim in claim 1, characterized in that each input circuit (I1, ..., I16) determines a respective bit rate of the input signals incoming on its associated input line and switches to the respective bit rate thus determined.

3. A switching element as claimed in claim 1, characterized in that each output circuit (O1, ..., O16) depending on the output signals intended for its associated output line is switched to a respective output bit rate accordingly.

4. A switching element as claimed in claim 1, characterized in that the switching between bit rates in the input circuits (I1, ..., I16) and in the output circuits (O1, ..., O16) is initiated by external control instructions.

5. A switching element as claimed in claim 1, characterized in that each output circuit (Oj) is associated with one input circuit (Ij), and that the bit rate is switched in both together.

6. A switching element as claimed in claim 1, characterized in that the input and output signals consist of data words following each other at regular time intervals and are combined into a synchronous time-division multiplex (STM) signal.

7. A switching element as claimed in claim 1, characterized in that the input and output signals consist of data packets or cells following each other at arbitrary time intervals and are combined into an asynchronous time-division multiplex (ATM) signal.

8. A switching element as claimed in claim 1, characterized in that the switching means are a main memory (Mem), a multiplexer (Mx), and a demultiplexer (Dx), that the multiplexer (Mx) has means for connecting each input circuit (I1, ..., I16) to the input of the memory (Mem), and that the demultiplexer (Dx) has means for connecting the output of the memory (Mem) to each output circuit (O1, ..., O16).

9. A switching element as claimed in claim 8, characterized in that the memory (Mem) is constructed so as to be capable of storing as many discretely addressable data words as can be transmitted at the highest bit rate during one frame period of the lowest bit rate.

10. A switching element as claimed in claim 6, characterized in that the memory (Mem) is constructed so as to be capable of storing as many discretely addressable data words as can be transmitted at the highest bit rate during one frame period of the lowest bit rate.

11. Space/time switching element for switching input signals and output signals in either a synchronous time-division multiplex (STM) or an asynchronous time-division multiplex (ATM) mode of data transmission, comprising a plurality of input circuits (I1, ..., I16) each associated with one of a plurality of input lines on each of which a plurality of input signals are receivable in a time-division multiplex mode, a plurality of output circuits (O1, ..., O16) each associated with one of a plurality of output lines on each of which a plurality of output signals are placeable in a time-division multiplex mode, and switching means (Mx, Mem, Dx) for selectively assigning all input signals and all output signals to one another, characterized in that each input circuit (I1, ..., I16) and each output circuit (O1, ..., O16) are separately switchable between two or more bit rates;

each input circuit (I1, ..., I16) determines a respective input bit rate of the input signals incoming on its associated input line and switches to the respective input bit rate; and each output circuit (O1, ..., O16) is switched to a respective output bit rate depending on the output signals intended for its associated output line.

* * * * *